(12) United States Patent
Doi et al.

(10) Patent No.: US 9,837,210 B2
(45) Date of Patent: Dec. 5, 2017

(54) LAMINATED CERAMIC CAPACITOR AND METHOD FOR MANUFACTURING LAMINATED CERAMIC CAPACITOR

(71) Applicant: Murata Manufacturing Co., Ltd., Nagaokakyo-shi, Kyoto-fu (JP)

(72) Inventors: Akitaka Doi, Nagaokakyo (JP); Shinichi Yamaguchi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 22 days.

(21) Appl. No.: 15/004,040

(22) Filed: Jan. 22, 2016

(65) Prior Publication Data
US 2016/0155571 A1 Jun. 2, 2016

Related U.S. Application Data
(63) Continuation of application No. PCT/JP2014/070205, filed on Jul. 31, 2014.

(30) Foreign Application Priority Data
Aug. 2, 2013 (JP) ................................. 2013-161136

(51) Int. Cl.
*H01G 4/12* (2006.01)
*H01G 4/30* (2006.01)
(Continued)

(52) U.S. Cl.
CPC ........... *H01G 4/1227* (2013.01); *H01G 4/008* (2013.01); *H01G 4/012* (2013.01); *H01G 4/12* (2013.01); *H01G 4/30* (2013.01)

(58) Field of Classification Search
None
See application file for complete search history.

(56) References Cited

U.S. PATENT DOCUMENTS 5,128,827 A 7/1992 Yokotani et al.
6,391,084 B1 * 5/2002 Ito .......................... B22F 1/0088
75/255

(Continued)

FOREIGN PATENT DOCUMENTS

JP 3-94409 A 4/1991
JP 5-290622 A 11/1993
(Continued)

OTHER PUBLICATIONS

International Search Report for PCT/JP2014/070205 dated Oct. 28, 2014.
Written Opinion for PCT/JP2014/070205 dated Oct. 28, 2014.

Primary Examiner — Dion R Ferguson
(74) Attorney, Agent, or Firm — Arent Fox LLP

(57) ABSTRACT

A laminated ceramic capacitor having internal electrodes configured such that Sn is dissolved in Ni, and, in a region of each of the internal electrodes at a depth of 2 nm from a surface thereof facing a ceramic dielectric layer, a CV value representing variation of a Sn/(Ni+Sn) ratio (ratio of number of atoms) is less than or equal to 32%. As a conductive paste for forming the internal electrodes, a conductive paste containing a Ni powder and a tin oxide powder which is represented by SnO or $SnO_2$ and has a specific surface area of more than or equal to 10 $m^2/g$ as determined by a BET method is used, or a conductive paste containing a Ni—Sn alloy powder is used, or a conductive paste containing a Ni—Sn alloy powder and a tin oxide powder which is represented by SnO or $SnO_2$ and has a specific surface area of more than or equal to 10 $m^2/g$ is used.

15 Claims, 2 Drawing Sheets

(51) Int. Cl.
*H01G 4/008* (2006.01)
*H01G 4/012* (2006.01)

(56) References Cited

U.S. PATENT DOCUMENTS

| | | | |
|---|---|---|---|
| 6,447,571 B1* | 9/2002 | Ito | B22F 1/0059 75/255 |
| 2013/0063858 A1* | 3/2013 | Dogan | H01G 4/1218 361/301.4 |
| 2013/0106560 A1* | 5/2013 | Zenzai | H01G 4/12 336/233 |
| 2013/0321980 A1* | 12/2013 | Suzuki | H01G 4/008 361/305 |

FOREIGN PATENT DOCUMENTS

| | | |
|---|---|---|
| JP | 10-321455 A | 12/1998 |
| JP | 11-283867 A | 10/1999 |
| JP | 2005-222831 A | 8/2005 |
| JP | 2011-151250 A | 8/2011 |
| WO | WO 2012/111592 A | 8/2012 |

* cited by examiner

LAMINATED CERAMIC CAPACITOR AND METHOD FOR MANUFACTURING LAMINATED CERAMIC CAPACITOR

CROSS REFERENCE TO RELATED APPLICATIONS

The present application is a continuation of International application No. PCT/JP2014/070205, filed Jul. 31, 2014, which claims priority to Japanese Patent Application No. 2013-161136, filed Aug. 2, 2013, the entire contents of each of which are incorporated herein by reference.

FIELD OF THE INVENTION

The present invention relates to a laminated ceramic capacitor having a structure in which internal electrodes are arranged to face each other with a dielectric ceramic layer interposed therebetween, and a method for manufacturing the laminated ceramic capacitor.

BACKGROUND OF THE INVENTION

With recent progress in electronics technology, laminated ceramic capacitors are required to have a smaller size and a larger capacity. In order to satisfy these requirements, a reduction in layer thickness has been advanced for ceramic dielectric layers constituting a laminated ceramic capacitor.

However, the reduction in the layer thickness of the ceramic dielectric layers relatively increases an electric field intensity applied per layer. Therefore, improved durability and reliability during application of a voltage are required.

As such a laminated ceramic capacitor, for example, there is known a laminated ceramic capacitor comprising a laminated body having a plurality of laminated ceramic dielectric layers and a plurality of internal electrodes formed along interfaces between the ceramic dielectric layers, and a plurality of external electrodes formed on an external surface of the laminated body and electrically connected with the internal electrodes (see PTD 1). In the laminated ceramic capacitor of PTD 1, internal electrodes using Ni as a main component are disclosed as the internal electrodes.

PTD 1: Japanese Patent Laying-Open No. 11-283867

SUMMARY OF THE INVENTION

However, in the laminated ceramic capacitor of PTD 1 including the internal electrodes using Ni as a main component, its high-temperature load life is not necessarily sufficient, and actually a laminated ceramic capacitor excellent in durability which has a longer high-temperature load life has been required to be developed.

The present invention has been made to solve the aforementioned problem, and an object of the present invention is to provide a laminated ceramic capacitor excellent in durability which has a sufficient high-temperature load life even when the thickness of ceramic dielectric layers is further reduced, and a method for manufacturing a laminated ceramic capacitor capable of reliably manufacturing such a laminated ceramic capacitor.

In order to solve the aforementioned problem, a laminated ceramic capacitor according to the present invention is a laminated ceramic capacitor, including: a ceramic laminated body in which a plurality of ceramic dielectric layers are laminated; a plurality of internal electrodes arranged within the ceramic laminated body to face each other with each of the ceramic dielectric layers being interposed therebetween; and external electrodes arranged on an external surface of the ceramic laminated body to be brought into conduction with the internal electrodes.

In the laminated ceramic capacitor, Sn is dissolved in Ni in the internal electrodes, and in a region of each of the internal electrodes at a depth of 2 nm from a surface thereof facing the ceramic dielectric layer, a CV value representing variation of a Sn/(Ni+Sn) ratio, which is a ratio of a content of Sn to a total content of Sn and Ni (ratio of number of atoms), is less than or equal to 32%.

Further, a method for manufacturing a laminated ceramic capacitor according to the present invention includes forming an unfired ceramic laminated body having a plurality of unfired ceramic dielectric layers and a plurality of unfired internal electrode patterns, the plurality of unfired ceramic dielectric layers, serving as the ceramic dielectric layers after being fired, being laminated, the plurality of unfired internal electrode patterns being formed by applying a conductive paste containing a Ni component and a Sn component, serving as the internal electrodes after being fired, arranged along a plurality of interfaces between the unfired ceramic dielectric layers; and obtaining the ceramic laminated body by firing the unfired ceramic laminated body. A conductive paste containing a Ni powder and a tin oxide powder which is represented by SnO or $SnO_2$ and has a specific surface area of more than or equal to 10 $m^2/g$ as determined by a BET method is used as the conductive paste.

Further, another method for manufacturing a laminated ceramic capacitor according to the present invention includes forming an unfired ceramic laminated body having a plurality of unfired ceramic dielectric layers and a plurality of unfired internal electrode patterns, the plurality of unfired ceramic dielectric layers, serving as the ceramic dielectric layers after being fired, being laminated, the plurality of unfired internal electrode patterns being formed by applying a conductive paste containing a Ni component and a Sn component, serving as the internal electrodes after being fired, arranged along a plurality of interfaces between the unfired ceramic dielectric layers; and obtaining the ceramic laminated body by firing the unfired ceramic laminated body, wherein a conductive paste containing a Ni—Sn alloy powder is used as the conductive paste.

Further, still another method for manufacturing a laminated ceramic capacitor according to the present invention includes forming an unfired ceramic laminated body having a plurality of unfired ceramic dielectric layers and a plurality of unfired internal electrode patterns, the plurality of unfired ceramic dielectric layers, serving as the ceramic dielectric layers after being fired, being laminated, the plurality of unfired internal electrode patterns being formed by applying a conductive paste containing a Ni component and a Sn component, serving as the internal electrodes after being fired, arranged along a plurality of interfaces between the unfired ceramic dielectric layers; and obtaining the ceramic laminated body by firing the unfired ceramic laminated body. A conductive paste containing a Ni—Sn alloy powder and a tin oxide powder which is represented by SnO or $SnO_2$ and has a specific surface area of more than or equal to 10 $m^2/g$ as determined by a BET method is used as the conductive paste.

The laminated ceramic capacitor according to the present invention is configured such that Sn is dissolved in Ni in the internal electrodes, and, in the region of each of the internal electrodes at a depth of 2 nm from the surface thereof facing the ceramic dielectric layer, the CV value representing variation of the Sn/(Ni+Sn) ratio, which is the ratio of the content of Sn to the total content of Sn and Ni (ratio of number of atoms), is less than or equal to 32%. Therefore, a laminated ceramic capacitor excellent in durability which has a long high-temperature load life can be provided.

In the present invention, Sn is dissolved in Ni in the internal electrodes such that Ni and Sn form an alloy (a Ni—Sn alloy is formed). Thereby, the state of an interface between a ceramic dielectric layer and an internal electrode (electric barrier height) is changed, which contributes to the improvement in high-temperature load life.

That is, in order to obtain a higher reliability, it is desirable that Ni and Sn form an alloy in the internal electrodes, and the Sn/(Ni+Sn) ratio in the interface between the ceramic dielectric layer and the internal electrode has a small variation.

In particular, it is important for the improvement in high-temperature load life that a Ni—Sn alloy exists in the interface between the ceramic dielectric layer and the internal electrode (specifically, in the region of each internal electrode at a depth of 2 nm from the surface thereof facing the ceramic dielectric layer), and the CV value representing variation of the Sn/(Ni+Sn) ratio is less than or equal to 32%.

It should be noted that, when the Sn/(Ni+Sn) ratio is not uniform, the effect is less obtained at a position of the interface having a low Sn concentration, and in a position of the interface having a high Sn concentration, the layer thickness of an element (ceramic dielectric layer) is locally reduced due to formation of a ball shape in the internal electrode, which may cause a reduction in reliability.

Further, the method for manufacturing the laminated ceramic capacitor according to the present invention includes the steps of: forming an unfired ceramic laminated body having a plurality of unfired ceramic dielectric layers and a plurality of unfired internal electrode patterns formed by applying a conductive paste containing a Ni component and a Sn component, and arranged along a plurality of interfaces between the unfired ceramic dielectric layers; and obtaining the ceramic laminated body by firing the unfired ceramic laminated body, wherein a conductive paste blended with a tin oxide powder which is represented by SnO or $SnO_2$ and has a specific surface area of more than or equal to 10 $m^2/g$ as determined by the BET method is used as the conductive paste. Therefore, the above laminated ceramic capacitor according to the present invention can be efficiently manufactured.

That is, since the conductive paste blended with a fine tin oxide powder having a large specific surface area of more than or equal to 10 $m^2/g$ as determined by the BET method is used, internal electrodes in which Sn is dissolved in Ni and a Ni—Sn alloy is formed can be reliably formed. This allows efficient manufacturing of a laminated ceramic capacitor having a long high-temperature load life and a high reliability, in which a Ni—Sn alloy exists in the interface between the ceramic dielectric layer and the internal electrode formed after being fired (specifically, in the region of each internal electrode at a depth of 2 nm from the surface thereof facing the ceramic dielectric layer), and the CV value representing variation of the Sn/(Ni+Sn) ratio is less than or equal to 32%.

In addition, internal electrodes having an intended Sn/(Ni+Sn) ratio can be easily formed by merely adjusting the ratio between the Ni powder and the tin oxide powder, and thus the degree of freedom of a manufacturing process can be kept high.

Further, in the method for manufacturing the laminated ceramic capacitor according to the present invention, a conductive paste containing a Ni—Sn alloy powder can also be used as the conductive paste, instead of using the conductive paste blended with a tin oxide powder which is represented by SnO or $SnO_2$ and has a specific surface area of more than or equal to 10 $m^2/g$ as determined by the BET method.

In this case, it is necessary to prepare the Ni—Sn alloy powder containing Ni and Sn in a ratio corresponding to the ratio between Ni and Sn constituting the internal electrodes (targeted ratio). Since the Ni—Sn alloy has a stable Sn/(Ni+Sn) ratio, it is possible to accurately form internal electrodes in which a Ni—Sn alloy exists in the interface between the ceramic dielectric layer and the internal electrode, and the CV value representing variation of the Sn/(Ni+Sn) ratio is less than or equal to 32%. Therefore, a laminated ceramic capacitor having a long high-temperature load life and a high reliability can be reliably manufactured.

Furthermore, a conductive paste containing a Ni—Sn alloy powder and a tin oxide powder which is represented by SnO or $SnO_2$ and has a specific surface area of more than or equal to 10 $m^2/g$ as determined by the BET method can also be used as the conductive paste.

In that case, it is necessary to prepare the Ni—Sn alloy powder and the tin oxide powder. For example, when an attempt is made to form internal electrodes having a predetermined Sn/(Ni+Sn) ratio, it is possible to ensure a main portion of the Sn/(Ni+Sn) ratio by means of the Ni—Sn alloy powder having a stable ratio between Ni and Sn, and finely adjust the Sn/(Ni+Sn) ratio by means of an added amount of the tin oxide powder. Therefore, the degree of freedom of a production process can be ensured.

DETAILED DESCRIPTION OF THE PREFERRED EMBODIMENTS

Hereinafter, an embodiment of the present invention will be illustrated to describe the features of the present invention in more detail.

First Embodiment

<Configuration of Laminated Ceramic Capacitor>

Figure 1:
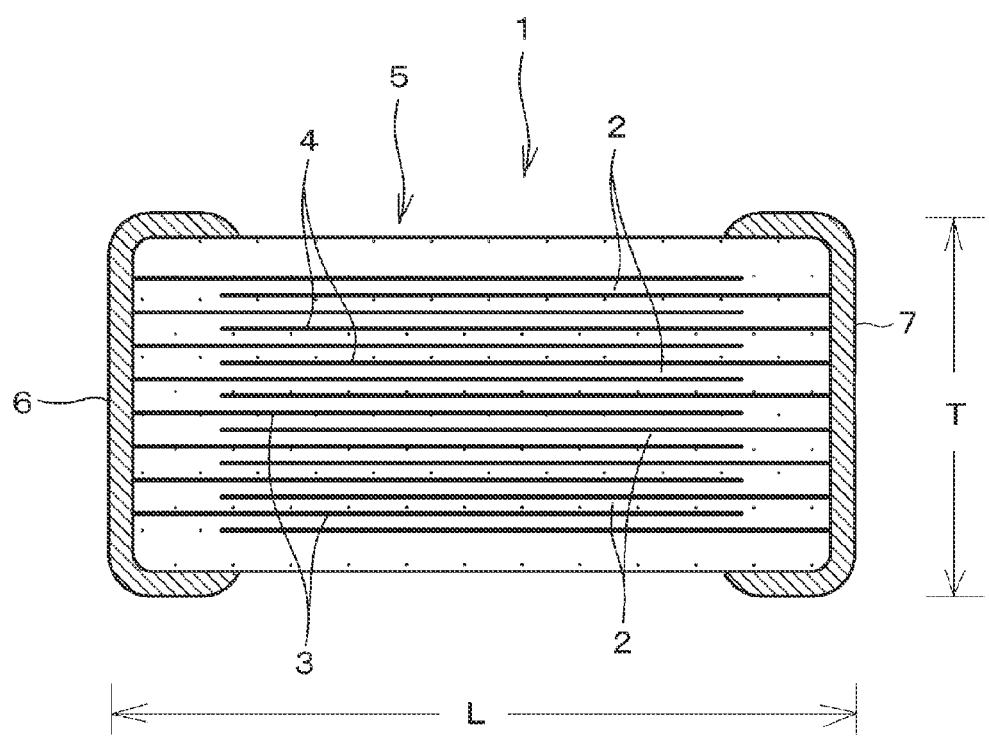
FIG. 1 is a front cross sectional view showing a configuration of a laminated ceramic capacitor in accordance with an embodiment of the present invention.

FIG. 1 is a front cross sectional view showing a configuration of a laminated ceramic capacitor in accordance with one embodiment (a first embodiment) of the present invention.

This laminated ceramic capacitor 1 includes a ceramic laminated body 5.

Ceramic laminated body 5 includes a plurality of laminated ceramic dielectric layers 2, and a plurality of internal electrodes 3, 4 arranged therein to face each other with each of ceramic dielectric layers 2 being interposed therebetween. It should be noted that internal electrodes 3, 4 arranged within ceramic dielectric layers 2 are alternately drawn to opposite end surfaces of ceramic laminated body 5.

In addition, on the end surfaces of ceramic laminated body 5 facing each other, external electrodes 6, 7 are arranged to be electrically connected with internal electrodes 3, 4.

External electrodes 6, 7 are formed on the end surfaces facing each other on an external surface of ceramic laminated body 5. In addition, external electrodes 6, 7 are respectively connected with internal electrodes 3, 4 alternately drawn to the opposite end surfaces.

It should be noted that, as a conductive material constituting external electrodes 6, 7, for example, a conductive material composed of Ag or Cu as a main component can be used.

It should be noted that, although laminated ceramic capacitor 1 in the first embodiment is of a two-terminal type including two external electrodes 6, 7, the present invention is also applicable to a laminated ceramic capacitor of a multi-terminal type having multiple external electrodes.

In laminated ceramic capacitor 1, internal electrodes 3, 4 are electrodes composed of a Ni—Sn alloy, in which Sn is dissolved in Ni, as a main component.

In addition, internal electrodes 3, 4 are configured such that, in a region of each of internal electrodes 3, 4 at a depth of 2 nm from a surface thereof facing ceramic dielectric layer 2 (also referred to as a near-interface region), a CV value representing variation of a Sn/(Ni+Sn) ratio, which is a ratio of a content of Sn to a total content of Sn and Ni (ratio of number of atoms), is less than or equal to 32%.

With such a configuration, laminated ceramic capacitor 1 having a long high-temperature load life and a high reliability can be obtained.

<Manufacturing of Laminated Ceramic Capacitor>

Next, a method for manufacturing laminated ceramic capacitor 1 in accordance with the above one embodiment (first embodiment) of the present invention will be described.

(1) First, predetermined amounts of a $BaCO_3$ powder and a $TiO_2$ powder were weighed as raw materials for a perovskite-type compound containing Ti and Ba. Subsequently, the weighed powders were mixed together with a ball mill and thereafter heat-treated under a predetermined condition, to obtain a barium titanate-based perovskite-type compound powder serving as a main component of a material constituting the ceramic dielectric layers.

(2) Next, powders of $Dy_2O_3$, MgO, MnO, and $SiO_2$ as sub components were prepared, and weighed such that the content of $Dy_2O_3$ was 0.75 parts by mol, the content of MgO was 1 part by mol, the content of MnO was 0.2 parts by mol, and the content of $SiO_2$ was 1 part by mol, with respect to 100 parts by mol of the main component described above. These powders were blended with the barium titanate-based perovskite-type compound powder as the main component, mixed with a ball mill for a certain period of time, and dried. Thereafter, the powders were dry-milled to obtain a raw material powder.

(3) Further, a polyvinyl butyral-based binder and an organic solvent such as ethanol were added to the raw material powder, and wet-mixed with a ball mill, to prepare slurry. This ceramic slurry was formed into a sheet by a doctor blade method to obtain a ceramic green sheet which would have a thickness of 0.8 μm after being fired. It should be noted that this ceramic green sheet is a ceramic green sheet serving as a dielectric ceramic layer after being fired.

(4) Further, a conductive paste for forming the internal electrodes was prepared by a method described below. As solid components, a metal powder (Ni powder in the present embodiment), a ceramic powder (a ceramic powder having the same composition as that of ceramic constituting the ceramic dielectric layers in the present embodiment) as a common material, and a tin oxide powder (SnO or $SnO_2$) having a predetermined specific surface area, and a dispersant and a solvent were mixed to obtain a first mill base.

As the above tin oxide (SnO or $SnO_2$), tin oxides having specific surface areas which were different in the range of 3 $m^2/g$ (sample number 11) to 173 $m^2/g$ (sample number 5) as shown in Table 1 were used.

It should be noted that the specific surface area of the above tin oxide (SnO or $SnO_2$) is a value determined by charging tin oxide (sample) into a sample cell, performing heating and deairing (degreasing) treatment, thereafter making a measurement by an adsorption method (used gas: $N_2$), and calculating the specific surface area by a BET one-point method.

Further, the ratio between the Ni powder and the tin oxide (SnO or $SnO_2$) was changed such that an average value of the Sn/(Ni+Sn) ratios (ratios of number of atoms) in the internal electrodes constituting the laminated ceramic capacitor obtained as a result, near interfaces with the ceramic dielectric layers, was in the range of 0.058 (sample number 11) to 0.169 (sample number 1) as shown in Table 1.

Then, the first mill base was put into a resin pot having a volume of 1 L together with balls, and pot mill dispersion treatment was performed by rotating the resin pot at a certain rotation speed for 12 hours, to obtain first slurry.

Next, an organic vehicle prepared beforehand by mixing ethyl cellulose and a solvent was added to the first slurry in the resin pot, to obtain a second mill base.

Subsequently, pot mill dispersion treatment was performed by rotating the resin pot at a certain speed for 12 hours, to obtain second slurry.

Then, with the second slurry being warmed, pressure filtration was performed under a condition of a pressure of less than 1.5 $kg/cm^2$, using a membrane-type filter having an aperture of 1 μm, to obtain a conductive paste.

(5) Next, the conductive paste was printed in a predetermined pattern on the ceramic green sheet fabricated as described above, to form a conductive paste layer (internal electrode pattern) which would serve as an internal electrode after being fired. The thickness of the conductive paste layer was set such that an internal electrode having a thickness of 0.6 μm would be obtained after being fired.

(6) Subsequently, a plurality of ceramic green sheets each having the internal electrode pattern formed thereon are laminated such that sides having the internal electrode patterns drawn thereto are alternately located on opposite sides, to obtain an unfired ceramic laminated body.

(7) The ceramic laminated body was heat-treated to burn the binder, and thereafter fired in a reduction atmosphere containing $H_2$—$N_2$—$H_2O$ gas, to obtain a ceramic sintered body (ceramic laminated body).

(8) Next, a Cu paste containing a glass frit was applied and baked on both end surfaces of the obtained ceramic laminated body, to form the external electrodes electrically connected with the internal electrodes. Thereby, laminated ceramic capacitors 1 (samples of sample numbers 1 to 11 in Table 1) having structures as shown in FIG. 1 were obtained.

It should be noted that the samples of sample numbers 10 and 11 with an asterisk mark in Table 1 are samples of comparative examples not satisfying the requirements of the present invention, and the samples of sample numbers 1 to 9 without an asterisk mark in Table 1 are samples of examples satisfying the requirements of the present invention.

It should be noted that each laminated ceramic capacitor obtained in the first embodiment had external dimensions of 0.5 mm in width (W), 1.0 mm in length (L), and 0.3 mm in thickness (T), and each ceramic dielectric layer interposed between the internal electrodes had a thickness of 0.8 μm. Further, the total number of effective ceramic dielectric layers interposed between the internal electrodes was 100, and the area of the facing electrodes per layer was $3 \times 10^{-7}$ m².

Subsequently, a method described below was performed on the laminated ceramic capacitors fabricated as described above, to investigate that "Sn exists in the internal electrodes", "Sn contained in the internal electrodes is alloyed with Ni", and "the Sn/(Ni+Sn) ratio in the near-interface region of each internal electrode".

Hereinafter, an explanation will be given.

(1) Confirmation that Sn Exists in the Internal Electrodes (1-1) Polishing

Each sample was held in a posture in which its length (L) direction extends along a vertical direction, the circumference of the sample was hardened with a resin, and a WT surface defined by the width (W) and the thickness (T) of the sample was exposed from the resin.

Subsequently, the WT surface of each sample was polished with a polishing machine to about half the depth in the length (L) direction of each sample. Then, after the polishing was finished, the polished surface was processed by ion milling to eliminate shear drop of the internal electrodes due to the polishing.

(1-2) Mapping Analysis of the Internal Electrodes

Figure 2:
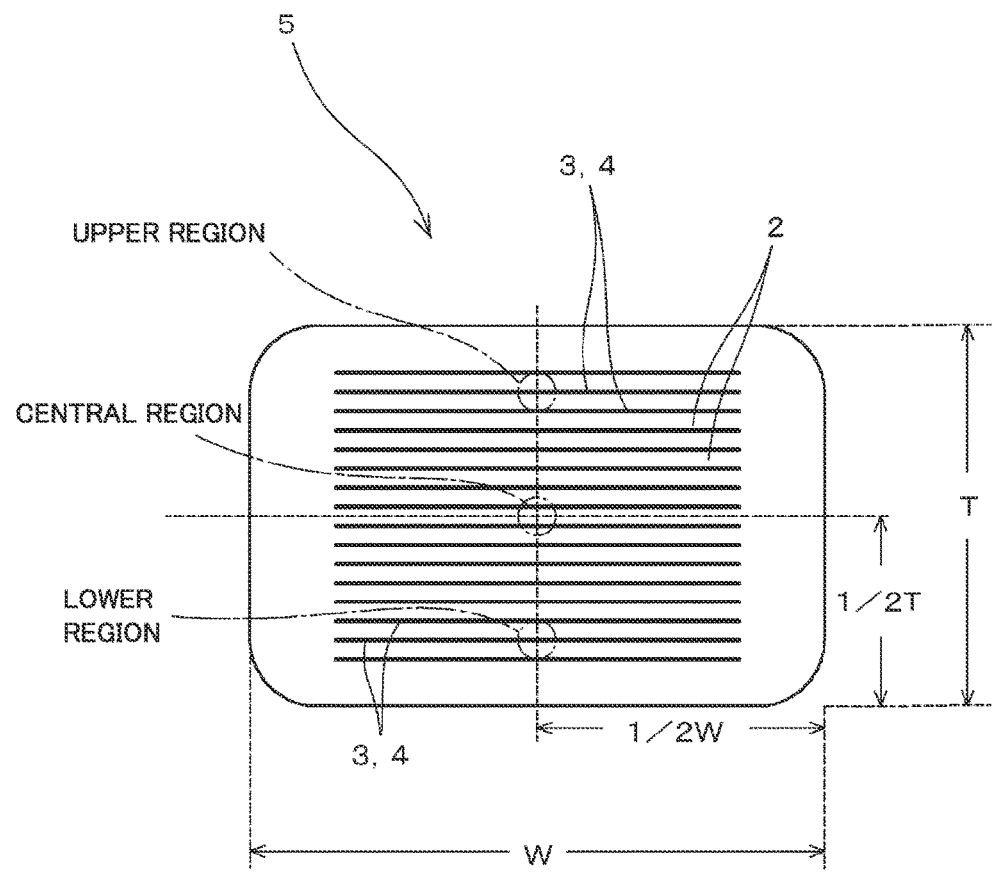
FIG. 2 is an explanatory view showing positions where mapping analysis of Ni and Sn by WDX were performed on internal electrodes constituting the laminated ceramic capacitor in accordance with the embodiment of the present invention.

Subsequently, as shown in FIG. 2, a region of the WT cross section where the internal electrodes were laminated, at a position about half in the L direction, was equally divided into three portions in the thickness (T) direction of each sample, and in three regions including a central region and regions close to upper and lower outer layer portions (ineffective portions) (that is, an upper region and a lower region), mapping analysis of Ni and Sn was performed by WDX (wavelength dispersive X-ray spectroscopy).

As a result, it was confirmed that Sn exists in the internal electrodes in each sample (the Sn component was blended in any of the samples of sample numbers 1 to 11).

(2) Confirmation that Sn Contained in the Internal Electrodes is Alloyed with Ni Each fired laminated ceramic capacitor (laminated body) was pulverized into a powder. The powder was analyzed by XRD.

As a result, it was confirmed that the peak position of Ni was shifted. This shows that Sn in the internal electrodes exists in the form of an alloy of Ni and Sn.

(3) Confirmation of Distribution of Sn in the Internal Electrodes

The region of the WT cross section of the fired laminated ceramic capacitor (laminated body) where the internal electrodes of each sample were laminated, at the position about half in the L direction, was equally divided into three portions in the T direction, and in each of the three regions including the central region and the regions close to the upper and lower outer layer portions (ineffective portions) (that is, the upper region and the lower region), a central portion in the W direction was processed using an FIB microsampling processing method, to fabricate a thin-piece sample for analysis.

It should be noted that the thin-piece sample was processed to have a thickness of less than or equal to 60 nm. Further, a damaged layer at the sample surface formed during the FIB processing was removed by Ar ion milling.

Furthermore, to process the sample for analysis, SMI3050SE (manufactured by Seiko Instruments, Inc.) was used for the FIB, and PIPS (manufactured by Gatan, Inc.) was used for the Ar ion milling.

Subsequently, the sample fabricated as described above was observed with a STEM (scanning transmission electron microscope), and four different internal electrodes were selected from each region in the sample.

Further, five interfaces between a ceramic element and an internal electrode which were substantially perpendicular to a cross section of the thin-piece sample (main surface of the thin-piece sample) were sought (five interfaces were sought for each of the four internal electrodes).

Then, analysis was performed on the internal electrode in contact with each substantially perpendicular interface, in a region 2 nm inward from the interface toward the internal electrode in a direction perpendicular to the substantially perpendicular interface (in a lamination direction) (hereinafter described as the near-interface region).

It should be noted that the interfaces substantially perpendicular to the cross section of the thin-piece sample were sought as described below. First, lines appearing on both sides of each interface, that is, fresnel fringes were observed with a STEM, to seek an interface where the contrast of the fresnel fringes changed substantially symmetrically on the both sides when the focus was changed. This interface was determined as an interface substantially perpendicular to the cross section of the thin-piece sample.

Further, in the analysis with the STEM, JEM-2200FS (manufactured by JEOL Ltd.) was used as the STEM. It has an acceleration voltage of 200 kV.

An SDD detector JED-2300T with an area of 60 mm² was used as a detector, and Noran System 7 (manufactured by Thermo Fisher Scientific K. K.) was used as an EDX system.

Then, at five near-interface regions for each of the four internal electrodes, that is, at a total of 20 positions, quantitative analysis of Ni and Sn was performed, using an EDX (Energy Dispersive X-ray analyzer). The diameter of a probe for measuring an electron beam was set to about 1 nm, and the measurement time was set to 30 seconds. It should be noted that Cliff Lorimer correction was used for quantitative correction from the obtained EDX spectrum.

Then, an average value of the Sn/(Ni+Sn) ratios, each of which was the ratio of the content of Sn to the total content of Sn and Ni (ratio of number of atoms), in the near-interface regions of the internal electrodes was calculated from the result of the quantitative analysis of Ni and Sn at the 20 positions, and a standard deviation and the CV value representing variation of the Sn/(Ni+Sn) ratio were calculated from the average value. Here, the CV value is a value calculated by the following equation:

CV value (%)=(standard deviation/average value)×100

It should be noted that Table 1 shows the average value of the ratios of the content of Sn to the total content of Sn and Ni (Sn/(Ni+Sn) ratios (ratios of number of atoms)), and the CV value.

<Evaluation of Characteristics>

For each of the laminated ceramic capacitors (samples of sample numbers 1 to 11 in Table 1) fabricated as described above, a high-temperature load test was performed by a method described below to calculate a MTTF.

First, electrostatic capacity was measured at an AC voltage of 0.5 Vrms and 1 kHz, using an automatic bridge-type measuring instrument, to select good products, and 10 good samples were obtained.

Subsequently, a high-temperature load test was performed on each of these samples under conditions of 165° C. and 6.3

V, and the time taken until the insulation resistance became 10 KΩ or lower was determined as a failure time. Then, the MTTF was calculated from this failure time. Table 1 also shows the result.

TABLE 1

| Sample No. | Type of Tin Oxide Powder | Specific Surface Area of Tin Oxide Powder ($m^2/g$) | Ratio of Sn to Ni + Sn in Near-interface Region of Internal Electrode (ratio of number of atoms) Sn/(Ni + Sn) Average Value | CV Value (%) | Reliability MTTF (hr) |
|---|---|---|---|---|---|
| 1 | $SnO_2$ | 43 | 0.169 | 9.4 | 60.7 |
| 2 | $SnO_2$ | 10 | 0.078 | 32.0 | 44.8 |
| 3 | $SnO_2$ | 86 | 0.087 | 2.8 | 56.3 |
| 4 | $SnO_2$ | 17 | 0.089 | 24.1 | 53.0 |
| 5 | $SnO_2$ | 173 | 0.086 | 1.8 | 55.5 |
| 6 | $SnO_2$ | 72 | 0.087 | 4.0 | 59.6 |
| 7 | $SnO_2$ | 35 | 0.065 | 18.6 | 50.0 |
| 8 | $SnO_2$ | 64 | 0.089 | 2.2 | 54.3 |
| 9 | $SnO_2$ | 22 | 0.074 | 21.4 | 48.1 |
| 10* | $SnO_2$ | 5 | 0.067 | 34.3 | 28.4 |
| 11* | $SnO_2$ | 3 | 0.058 | 39.0 | 10.7 |

The samples of sample numbers 1 to 9 are samples of the examples satisfying the requirements of the present invention, and the samples of sample numbers 10 and 11 are samples of the comparative examples not satisfying the requirements of the present invention.

As shown in Table 1, in the case of the samples of sample numbers 10 and 11 (samples of the comparative examples not satisfying the requirements of the present invention) in which the CV value representing variation of the Sn/(Ni+Sn) ratio, which was the ratio of the content of Sn to the total content of Sn and Ni (ratio of number of atoms), was more than 32%, MTTFs in the high temperature load test were 28.4 and 10.7.

In contrast, in the case of the samples of sample numbers 1 to 9 (samples of the examples satisfying the requirements of the present invention) in which the CV value representing variation of the Sn/(Ni+Sn) ratio was less than or equal to 32%, MTTFs in the high temperature load test were in the range of 44.8 to 60.7, and it was confirmed that the MTTFs were considerably improved. Although the reason therefor is not necessarily clear, it is thought to be because the state of the interface between the ceramic dielectric layer and the internal electrode (electric barrier height) is changed by the formation of a Ni—Sn alloy in the internal electrode.

It should be noted that, in the present invention, a higher Sn/(Ni+Sn) ratio in the region of each internal electrode at a depth of 2 nm from the surface thereof facing the ceramic dielectric layer (near-interface region) is desirable for the improvement in high-temperature load life, and the Sn/(Ni+Sn) ratio has no particular upper limit value.

This is because the higher Sn/(Ni+Sn) ratio is believed to increase the degree of change in the state of the interface between the ceramic dielectric layer and the internal electrode (electric barrier height).

Further, in the present invention, the lower limit for the Sn/(Ni+Sn) ratio is not particularly restricted either, and the present invention is widely applicable when the internal electrodes are composed of a Ni—Sn alloy as a main component. However, it is usually desirable that the Sn/(Ni+Sn) ratio is more than or equal to 0.02.

It should be noted that, although the maximum value of the Sn/(Ni+Sn) ratio (ratio of number of atoms) in the region of each internal electrode at a depth of 2 nm from the surface thereof facing the ceramic dielectric layer is 0.169 in Table 1, it has been confirmed that, also when the Sn/(Ni+Sn) ratio (number of atoms) is more than or equal to 0.20, the effect of improving the MTTF is obtained by setting the CV value to less than or equal to 32.0%.

The result of the embodiment described above shows that, in the laminated ceramic capacitor of the present invention, it is desirable from the viewpoint of improving the MTTF that the Sn/(Ni+Sn) ratio in the interface between the ceramic dielectric layer and the internal electrode (the region 2 nm inward from the interface between a ceramic element portion and the internal electrode toward the internal electrode (near-interface region)) has a small variation.

On the other hand, when the CV value representing variation of the Sn/(Ni+Sn) ratio in the near-interface region of each internal electrode has a magnitude such as more than 32%, the effect is less obtained at a position of the interface having a low Sn concentration, and a position of the interface having a high Sn concentration has such a problem that the layer thickness of an element is locally reduced due to formation of a ball shape in the internal electrode and thus reliability is reduced, which is not preferable.

It should be noted that, in order to suppress variation of the Sn/(Ni+Sn) ratio in the near-interface region of each internal electrode (that is, in order to form a uniform interface), the Sn component contained in the conductive paste should be uniformly distributed. For that purpose, it is preferable to use a conductive paste containing a Ni powder and a tin oxide powder (SnO or $SnO_2$) having a small particle size and a large specific surface area. The above embodiment shows that it is preferable to use a tin oxide powder having a specific surface area of more than or equal to 10 $m^2/g$, as the tin oxide powder (SnO or $SnO_2$).

Further, using a conductive paste containing a Ni—Sn alloy powder as the conductive paste is also effective to suppress variation of the Sn/(Ni+Sn) ratio in the near-interface region of each internal electrode and form an interface having a uniform Sn/(Ni+Sn) ratio.

Furthermore, it is also possible to use a conductive paste in which a tin oxide powder (SnO or $SnO_2$) having a specific surface area of more than or equal to 10 $m^2/g$ and a Ni—Sn alloy are blended in combination. For example, it is possible to form internal electrodes in which the Sn/(Ni+Sn) ratio in an interface has a value as intended and the CV value is less than or equal to 32%, using a conductive paste containing a Ni—Sn alloy having a ratio between Ni and Sn (Sn/(Ni+Sn) ratio) different from a targeted Sn/(Ni+Sn) ratio, and a tin oxide powder (SnO or $SnO_2$) having a specific surface area of more than or equal to 10 $m^2/g$.

It should be noted that it has been confirmed that variation of the Sn/(Ni+Sn) ratio in the near-interface region can be reduced and the MTTF can be improved, also when the conductive paste containing a Ni—Sn alloy powder is used and when the conductive paste in which a tin oxide powder (SnO or $SnO_2$) having a large specific surface area of more than or equal to 10 $m^2/g$ and a Ni—Sn alloy are blended in combination is used as described above.

Further, in the laminated ceramic capacitor of the present invention, an element contained in the ceramic dielectric layer or the internal electrode other than Ni and Sn may exist in the interface between the ceramic dielectric layer and the internal electrode.

Furthermore, a different phase other than Ni and Sn may exist at a portion of the interface between the ceramic dielectric layer and the internal electrode.

Moreover, the common material blended with the conductive paste may have the same composition as that of the ceramic material powder constituting the ceramic dielectric layers, may be a material which does not contain some constituent elements, may be a material which contains some different constituent elements, or may be a material having a different blending ratio.

Further, in the present invention, a conductive paste which does not contain a common material can also be used as the conductive paste.

In addition, the ceramic material constituting the ceramic dielectric layers and the ceramic material constituting the common material are desirably composed of a perovskite-type oxide as a main component. Although $BaTiO_3$, which is a perovskite-type oxide, is used as a ceramic material in the embodiment described above, Ba constituting $BaTiO_3$ may be partially substituted by Ca or Sr, or Ti constituting $BaTiO_3$ may be partially substituted by Zr. Further, it is also possible to use another perovskite-type compound such as $CaZrO_3$.

The present invention is not limited to the embodiment described above also in other respects, and various applications and modifications can be made within the scope of the invention in regard to the numbers of the ceramic dielectric layers and internal electrodes constituting the ceramic laminated body, and the like.

REFERENCE SIGNS LIST

1: laminated ceramic capacitor; 2: ceramic dielectric layer; 3, 4: internal electrode; 5: ceramic laminated body; 6, 7: external electrode; L: length; T: thickness; W: width.

The invention claimed is:

1. A laminated ceramic capacitor, comprising:
a ceramic laminated body having a plurality of ceramic dielectric layers and a plurality of internal electrodes arranged to face each other with a ceramic dielectric layer of the plurality of ceramic dielectric layers being interposed therebetween; and
at least two external electrodes arranged on an external surface of the ceramic laminated body, a first of the at least two external electrodes being in conduction with a first set of the plurality of internal electrodes, and a second of the at least two external electrodes being in conduction with a second set of the plurality of internal electrodes, wherein
Sn is dissolved in Ni in the internal electrodes, and
a coefficient of variation value CV of a Sn/(Ni+Sn) ratio, which is represented by [{standard deviation of the Sn/(Ni+Sn) ratio}/{average value of the Sn/(Ni+Sn) ratio}]×100, is less than or equal to 32%, where the Sn/(Ni+Sn) ratio is a ratio of a content of a number of atoms of Sn to a total content of Sn and Ni in a region of each of the plurality of internal electrodes at a depth of 2 nm from a surface thereof facing the ceramic dielectric layer interposed therebetween.

2. The laminated ceramic capacitor according to claim 1, wherein the plurality of ceramic dielectric layers have a barium titanate-based perovskite compound as a main component thereof.

3. A method for manufacturing a laminated ceramic capacitor, the method comprising:
forming an unfired ceramic laminated body having a plurality of unfired ceramic dielectric layers and a plurality of unfired internal electrode patterns arranged along a plurality of interfaces between the unfired ceramic dielectric layers, the plurality of unfired internal electrode patterns being formed by applying a conductive paste containing a Ni powder and a tin oxide powder which is represented by SnO or $SnO_2$ and has a specific surface area of more than or equal to 10 $m^2/g$ as determined by a BET method; and
firing the unfired ceramic laminated body to obtain a ceramic laminated body having a plurality of ceramic dielectric layers and a plurality of internal electrodes arranged along a plurality of interfaces between the ceramic dielectric layers.

4. The method for manufacturing the laminated ceramic capacitor according to claim 3, wherein the plurality of unfired ceramic dielectric layers have a barium titanate-based perovskite compound as a main component thereof.

5. The method for manufacturing the laminated ceramic capacitor according to claim 3, further comprising forming at least two external electrodes on an external surface of the ceramic laminated body, a first of the at least two external electrodes being in conduction with a first set of the plurality of internal electrodes, and a second of the at least two external electrodes being in conduction with a second set of the plurality of internal electrodes.

6. The method for manufacturing the laminated ceramic capacitor according to claim 3, wherein, after firing, the Sn is dissolved in Ni in the internal electrodes, and a coefficient of variation value CV of a Sn/(Ni+Sn) ratio, which is represented by [{standard deviation of the Sn/(Ni+Sn) ratio}/{average value of the Sn/(Ni+Sn) ratio}]×100, is less than or equal to 32%, where the Sn/(Ni+Sn) ratio is a ratio of a content of a number of atoms of Sn to a total content of Sn and Ni in a region of each of the plurality of internal electrodes at a depth of 2 nm from a surface thereof facing the ceramic dielectric layer interposed therebetween.

7. The method for manufacturing the laminated ceramic capacitor according to claim 3, wherein the conductive paste containing the Ni powder and the tin oxide powder which is represented by SnO or $SnO_2$ further contains a Ni—Sn alloy powder.

8. The method for manufacturing the laminated ceramic capacitor according to claim 7, wherein the plurality of ceramic dielectric layers have a barium titanate-based perovskite compound as a main component thereof.

9. The method for manufacturing the laminated ceramic capacitor according to claim 7, further comprising forming at least two external electrodes on an external surface of the ceramic laminated body, a first of the at least two external electrodes being in conduction with a first set of the plurality of internal electrodes, and a second of the at least two external electrodes being in conduction with a second set of the plurality of internal electrodes.

10. A method for manufacturing a laminated ceramic capacitor, the method comprising:
forming an unfired ceramic laminated body having a plurality of unfired ceramic dielectric layers and a plurality of unfired internal electrode patterns arranged along a plurality of interfaces between the unfired ceramic dielectric layers, the plurality of unfired internal electrode patterns being formed by applying a conductive paste containing a Ni—Sn alloy powder; and
firing the unfired ceramic laminated body to obtain a ceramic laminated body having a plurality of ceramic dielectric layers and a plurality of internal electrodes arranged along a plurality of interfaces between the ceramic dielectric layers,
wherein, after the firing, the Sn is dissolved in Ni in the internal electrodes, and a coefficient of variation value CV of a Sn/(Ni+Sn) ratio, which is represented by [{standard deviation of the Sn/(Ni+Sn) ratio}/{average value of the Sn/(Ni+Sn) ratio}]×100, is less than or equal to 32%, where the Sn/(Ni+Sn) ratio is a ratio of a content of a number of atoms of Sn to a total content of Sn and Ni in a region of each of the plurality of internal electrodes at a depth of 2 nm from a surface thereof facing a ceramic dielectric layer interposed therebetween.

11. The method for manufacturing the laminated ceramic capacitor according to claim 10, wherein the plurality of ceramic dielectric layers have a barium titanate-based perovskite compound as a main component thereof.

12. The method for manufacturing the laminated ceramic capacitor according to claim 10, further comprising forming at least two external electrodes on an external surface of the ceramic laminated body, a first of the at least two external electrodes being in conduction with a first set of the plurality of internal electrodes, and a second of the at least two external electrodes being in conduction with a second set of the plurality of internal electrodes.

13. The method for manufacturing the laminated ceramic capacitor according to claim 10, wherein the conductive paste containing the Ni—Sn alloy powder further contains a tin oxide powder which is represented by SnO or $SnO_2$ and has a specific surface area of more than or equal to 10 $m^2/g$ as determined by a BET method.

14. The method for manufacturing the laminated ceramic capacitor according to claim 13, wherein the plurality of ceramic dielectric layers have a barium titanate-based perovskite compound as a main component thereof.

15. The method for manufacturing the laminated ceramic capacitor according to claim 13, further comprising forming at least two external electrodes on an external surface of the ceramic laminated body, a first of the at least two external electrodes being in conduction with a first set of the plurality of internal electrodes, and a second of the at least two external electrodes being in conduction with a second set of the plurality of internal electrodes.

* * * * *